(12) United States Patent
Sripada et al.

(10) Patent No.: US 8,473,886 B2
(45) Date of Patent: Jun. 25, 2013

(54) PARALLEL PARASITIC PROCESSING IN STATIC TIMING ANALYSIS

(75) Inventors: Subramanyam Sripada, Hillsboro, OR (US); Qiuyang Wu, Portland, OR (US); Patrick D. Fortner, Beaverton, OR (US)

(73) Assignee: Synopsys, Inc., Mountain View, CA (US)

( * ) Notice: Subject to any disclaimer, the term of this patent is extended or adjusted under 35 U.S.C. 154(b) by 16 days.

(21) Appl. No.: 12/879,682

(22) Filed: Sep. 10, 2010

(65) Prior Publication Data

US 2012/0066656 A1 Mar. 15, 2012

(51) Int. Cl.
*G06F 17/50* (2006.01)
(52) U.S. Cl.
USPC .......................................................... 716/113
(58) Field of Classification Search
USPC .................................................. 716/100, 113
See application file for complete search history.

(56) References Cited

U.S. PATENT DOCUMENTS

| | | | |
|---|---|---|---|
| 2005/0066296 A1* | 3/2005 | Visweswariah | 716/6 |
| 2007/0106969 A1* | 5/2007 | Birch et al. | 716/6 |
| 2007/0266356 A1* | 11/2007 | Chang et al. | 716/6 |
| 2008/0172642 A1* | 7/2008 | Abbaspour et al. | 716/6 |
| 2008/0307379 A1* | 12/2008 | Visweswariah | 716/6 |
| 2012/0311514 A1* | 12/2012 | Lavin et al. | 716/108 |

* cited by examiner

*Primary Examiner* — Suchin Parihar
(74) *Attorney, Agent, or Firm* — Bever, Hoffman & Harms, LLP; Jeanette S. Harms

(57) ABSTRACT

A static timing analysis (STA) technique including a main process and a parallel process is described. In the main process, an IC design can be loaded and then linked to a cell library. Timing constraints to be applied to the IC design can be loaded. A timing update for the IC design can be performed. A report based on the timing update can be output. In the parallel process, the interconnect parasitics can be back-annotated onto the IC design. In one embodiment, the interconnect parasitics can be processed and stored on disk. Information on attaching to the stored parasitic data can be generated and provided to the main process during the step of performing the timing update. The parallel process can run concurrently and asynchronously with the main process.

20 Claims, 8 Drawing Sheets

PARALLEL PARASITIC PROCESSING IN STATIC TIMING ANALYSIS

BACKGROUND OF THE INVENTION

1. Field of the Invention

The present invention relates to static timing analysis, and in particular to parallel parasitic processing used during static timing analysis or distributed static timing analysis.

2. Related Art

FIG. 1 shows a simplified representation of an exemplary digital ASIC design flow. At a high level, the process starts with the product idea (step 100) and is realized in an EDA software design process (step 110). When the design is finalized, it can be taped-out (event 140). After tape out, the fabrication process (step 150) and packaging and assembly processes (step 160) occur resulting, ultimately, in finished chips (result 170).

The EDA software design process (step 110) is actually composed of a number of steps 112-130, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 110) will now be provided:

System design (step 112): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro, Nanotime, and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 126): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks for lithographic use to produce finished chips. Exemplary EDA software products from Synopsys, Inc. that can be used at this step include the CATS® family of products.

Referring back to netlist verification (step 118), ignoring timing violations during design implementation can result in designs that fail to meet performance specifications or even fail in silicon. Given tight market windows and multi-million dollar re-spin costs, these design failures can be financially consequential to semiconductor companies. Therefore, design engineers are increasingly demanding techniques to identify timing violations in a design. One such technique, called static timing analysis, attempts to exhaustively analyze all critical paths of a design.

FIG. 2 illustrates a conventional static timing (STA) technique including setup 210 and timing analysis 211. During setup 210, step 201 can load an integrated circuit (IC) design. In one embodiment, the design can be in the form of a gate-level netlist. At this point, the IC design can be linked to, i.e. mapped to, one or more cell libraries at the desired technology node.

Step 202 can back-annotate the interconnect parasitics of the design onto the IC design using the netlist. Parasitics can include the capacitance from a conductor to ground, the capacitance between conductors, and bulk resistance. In one embodiment, the parasitics of the design can be stored in a set of IEEE Standard Parasitic Exchange Format (SPEF) files. Step 203 can load any timing constraints and exceptions to be applied to the design.

During timing analysis 211, step 204 can perform a timing update for the design using the parasitics, timing constraints, and exceptions. In general, this timing update can include building a timing graph corresponding to the gate level netlist based on the timing constraints and exceptions. This timing graph can be finalized, i.e. the vertices of the graph are given level numbers so that standard algorithms, e.g. a breadth first search that starts at a root node and explores all neighboring nodes, can then be applied on the timing graph. In one embodiment, techniques can be applied to break any loops that might occur in the timing graph. Then, any constants from the timing constraints or from the netlist can be propagated in the timing graph. Using the finalized timing graph, delays, slews, and slacks can be calculated and propagated. At this point, timing analysis can be performed and one or more reports can be output in step 205.

Conventionally, setup 210 has generally been performed before timing analysis 211. Specifically, an STA tool progresses through each of steps 201-205 in order and proceeds to the following step only after the previous step has been completed. Of these steps, back-annotating interconnect parasitics (step 202) is often the largest portion of the analysis setup runtime, e.g. approximately 50% of the setup time and 10-15% of the total runtime. Therefore, a need arises for improving performance of STA.

To improve STA efficiency, an STA tool can manage multiple runs having different parameters and automatically merge the results of these runs. Parameters can include, but are not limited to, modes (e.g. test mode, normal operation mode, power-down mode, etc.) and corners (e.g. process parameters including minimum and maximum temperature, minimum and maximum voltage, etc.). This type of STA is called distributed static timing analysis (DSTA) and is described in further detail in U.S. Pat. No. 7,739,098, issued on Jun. 15, 2010, and entitled, "SYSTEM AND METHOD FOR PROVIDING DISTRIBUTED STATIC TIMING ANALYSIS WITH MERGERED RESULTS". In one embodiment of DSTA, a master STA process (master) can initiate and coordinate the multiple runs performed by slave STA processes (slaves), and merge the results of the slaves. In such an embodiment, the master can partition the netlist and dispatch data to the slaves. Specifically, in DSTA, the operations 201, 202, 203 are done sequentially at the master and the operations 204, 205 are done in parallel at the slaves.

In general, in DSTA, the master consumes memory to hold the parasitic data for timing or signal integrity analysis, so as to facilitate partitioning and dispatching the parasitic data to the slaves. Therefore, a need arises for improving performance and memory of the DSTA master. Specifically, a need arises for dealing with the increase of time associated with setup in STA as well as reducing the memory requirements for DSTA.

SUMMARY OF THE INVENTION

A static timing analysis (STA) technique including a main process and a parallel process is described. In the main process, an integrated circuit (IC) design can be loaded and then linked to a cell library. Timing constraints to be applied to the IC design can be loaded. A timing update for the IC design can be performed. A report based on the timing update can be output.

In the parallel process, the interconnect parasitics can be back-annotated onto the IC design. In one embodiment, the interconnect parasitics can be processed and stored on a storage device in an indexable format. Information on attaching to the stored parasitic data can be generated and provided to the main process during the step of performing the timing update, specifically during the calculations for delay, slack, and slew. Notably, the parallel process can run concurrently and asynchronously with the main process.

Another STA technique is also described in which the main process performs a timing update for an IC design. During the running of the main process, interconnect parasitic data of the IC design can be automatically identified, scheduled, and routed to one or more different processes to provide temporally overlapping data processing and consumption. The results of the one or more different processes can be used in the main process to perform the timing update for the IC design.

A distributed static timing analysis (DSTA) technique including main and parallel processes is also described. In the main process of a master, the IC design can be loaded and then linked to a cell library. The timing constraints to be applied to the IC design can be loaded. A timing graph associated with the IC design can be built and finalized.

In the parallel process of the master, the interconnect parasitics can be back-annotated onto the IC design. In one embodiment, these interconnect parasitics can be stored on a storage device in an indexable format. Information on attaching to the stored parasitic data can be generated and provided to individual slaves In each slave, timing values for a section of the IC design (determined by the master) can be calculated using the timing constraints and exceptions, the timing graph, the stored parasitic data, and the information on attaching. The slave can then output a report based on the calculated timing values. Notably, the parallel process runs concurrently and asynchronously with the main process. In one embodiment, generating the timing update includes requesting the stored parasitic data and information on attaching.

In one embodiment, the parallel parasitic process includes compiling the interconnect parasitics before loading the IC design in the main process and efficiently storing the compiled interconnect parasitics. For example, in one embodiment, the compiled interconnect parasitics can be stored in a binary format. The compiled interconnect parasitics can later be back-annotated on the netlist of the IC design. In one embodiment, this back-annotation can be done by the parallel process, which is then stored on the storage device in an indexable format.

Parallel parasitic processing, which runs asynchronously to main processing, can advantageously improve STA/DSTA capacity and performance. Additionally, these improvements are fully automatic and require minimal modifications to integrate into the STA/DSTA flow.

DETAILED DESCRIPTION OF THE DRAWINGS

Figure 3:
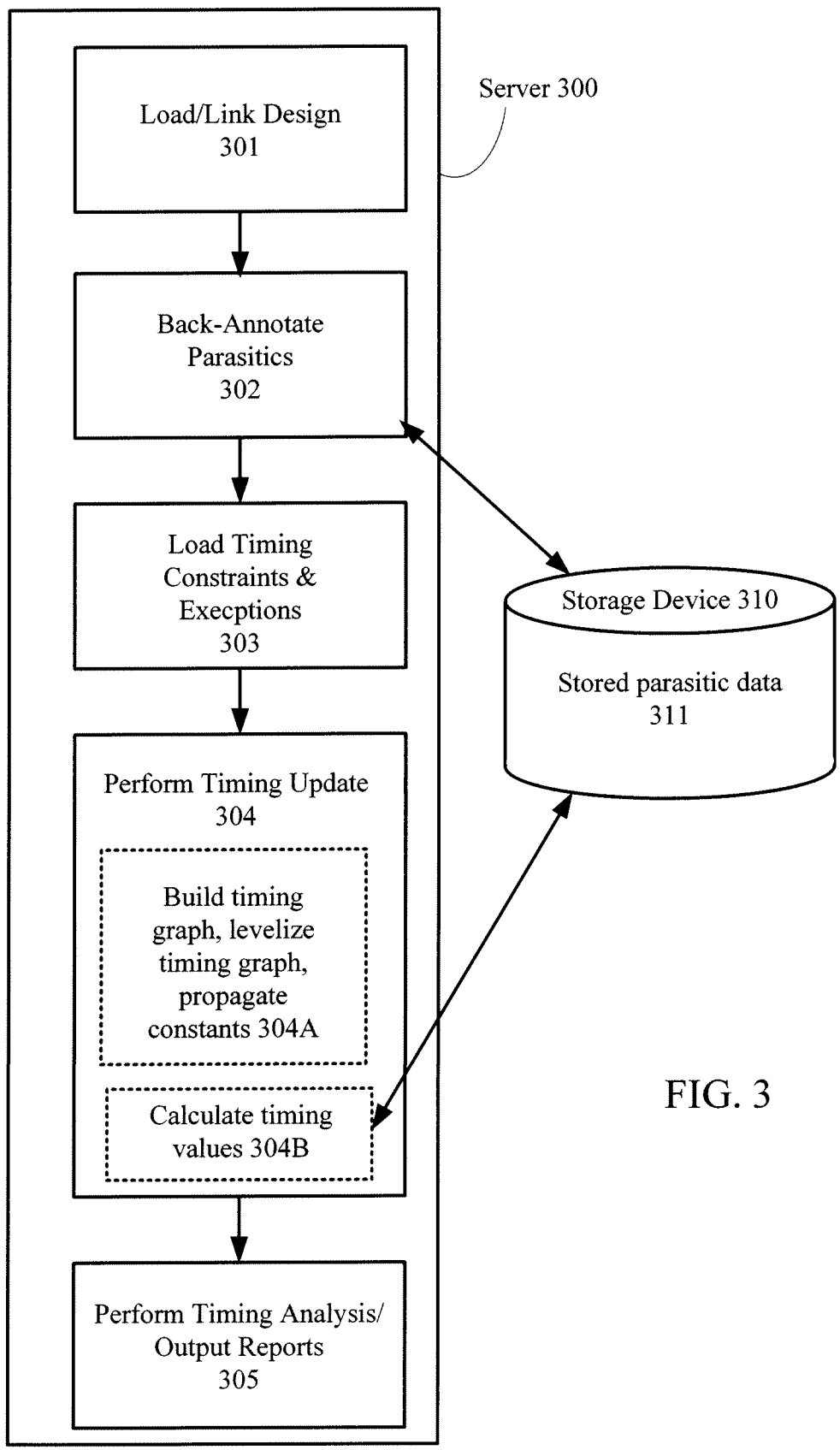
FIG. 3 illustrates an exemplary STA technique including a setup and timing analysis that uses stored parasitic data.

In accordance with one improved STA technique, a storage device can be used to free up memory on the server performing STA. For example, FIG. 3 illustrates an exemplary STA operation that can use a server 300 and a storage device 310. Steps 301-305, described below, can be performed on a server 300. Specifically, step 301 can load an integrated circuit (IC)

design and then link the IC design to the appropriate cell library/libraries at the desired technology node.

Step 302 can load the interconnect parasitics of the design from the parasitic files and back-annotate these interconnect parasitics onto the IC design using the netlist. Step 303 can load any timing constraints and exceptions to be applied to the design.

Step 304 can perform a timing update, which can include building a timing graph, levelizing the timing graph, and propagating constants in the timing graph to generate a finalized timing graph 304A. The timing update can also include calculating the timing values 304B for the design using the finalized timing graph. Exemplary timing values include, but are not limited to, timing delays, slews, and slacks. After timing analysis is performed using the calculated timing values, one or more reports can be output in step 305.

Notably, step 302 can store parasitic data 311 on storage device 310 rather than on server 300. Storage device 310 can be implemented using a hard drive disk (HDD), a solid state disk (SSD), RAM (random access memory), storage associated with cloud computing, or any other type of storage/cache. In one embodiment, the interconnect parasitics can be stored in an indexable format so that the parasitics for a given net can be queried directly. This storage on storage device 310 can free up considerable memory on server 300. Note that step 304 can access parasitic data as needed during step 304 by issuing a command to storage device 310 and copying that parasitic data onto server 300.

Figure 4:
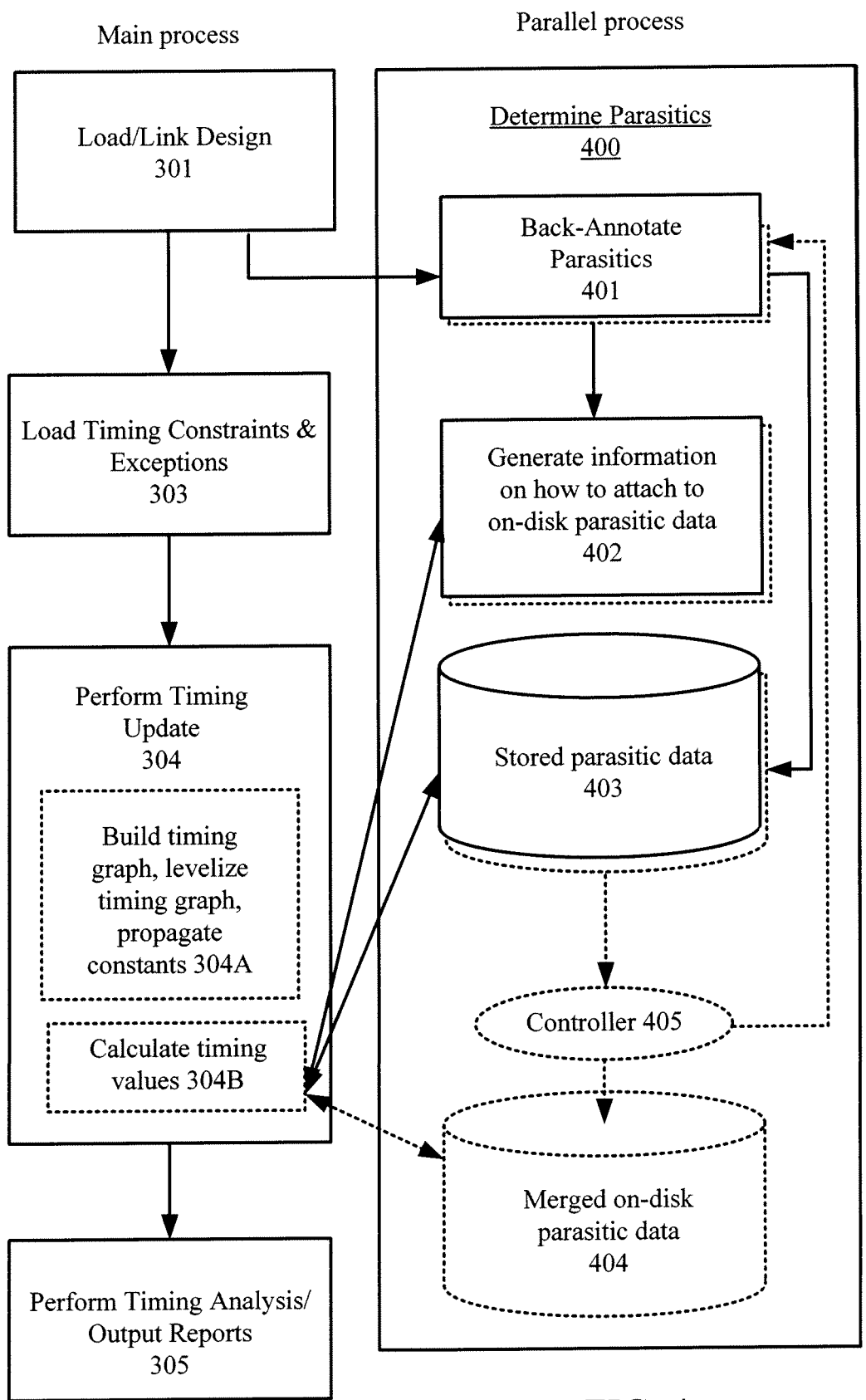
FIG. 4 illustrates an exemplary STA technique that uses parallel parasitic processing and stores parasitic processing results on a storage device. A main process can access the stored parasitic data as well as attachment information from the parallel process.

In accordance with another embodiment of an improved STA technique, a parallel process handling parasitics can be created. FIG. 4 illustrates an exemplary improved STA technique including a parallel process, i.e. step 400, which can begin after load/link design step 301 (wherein elements having the same numerals have the same functionality). This parallel process can advantageously back-annotate the interconnect parasitics onto the IC design and store the interconnect parasitics on a storage device in parallel with certain steps of a main process, specifically steps 303 and 304A. Because the calculation of timing values requires parasitic values, the stored parasitics prepared by the parallel process are attached into the main process in step 304B. Note that step 400 can be run on one or more local or remote hosts. Note that other STA embodiments can include a set of parallel processes (described further below).

In one embodiment, after step 301 is complete, steps 303-304A can proceed in parallel with step 400. In another embodiment of the parallel process of FIG. 4, step 400 can be started as soon as the first parasitic command is identified in step 301. In yet another embodiment described in further detail in reference to FIGS. 7A and 7B, the program script can be pre-processed to allow the parallel process to start at the beginning of step 301, thereby providing maximum performance and leveraging of the parallel processing.

After the main process launches the parallel process, i.e. step 400, the main process can proceed with the next command in the script, e.g. a command associated with step 301 or step 302. Notably, the parasitic commands can be queued in the parallel process without blocking script execution at the main process. That is, executing commands associated with step 303 are not dependent on the completion of commands in step 400. Thus, parasitic-independent steps, such as loading timing constraints (step 303) and certain aspects of performing the timing update (step 304), e.g. building the timing graph, levelizing the timing graph, and propagating constants in the graph (step 304A) are able to be performed in the main process concurrently and asynchronously with steps performed in the parallel process.

Notably, the parallel process includes step 400, which can back-annotate the interconnect parasitics onto the IC design in step 401 and generate parasitic data 403 that can be stored on a storage device (e.g. storage device 310 (FIG. 3). Step 402 can generate information on how to attach to such stored parasitic data. Step 304B can receive this attachment information from step 402 when needed by the main process for the calculation of timing values. In one embodiment, the main process can wait until the parallel process is able to supply the timing update engine with parasitic information. At this point, the main process can access stored parasitic data 403. In one embodiment, described in further detail below with respect to distributed STA embodiments, multiple parallel processes can be run concurrently and asynchronously (shown in FIG. 4 as shadow elements in step 400).

During step 401, the parasitic commands can be queued as they are identified by the main process. In one embodiment, if more than one parallel process is launched, a controller 405 can perform the queuing in step 401. In this case, each parallel process can process its own parasitic commands, generate its own randomly-accessible stored parasitic database, and generate its own information on how to attach to the parasitic data (two parallel processes shown in FIG. 4). In one embodiment, these parallel processes can communicate their parasitic data 403 to controller 405, which can generate merged, stored parasitic data 404. Step 304B can access this merged, parasitic data when needed by the main process. In one embodiment, step 304B accesses the merged, parasitic data instead of directly from the individual parallel processes, i.e. parasitic data 403. In another embodiment, if controller 405 does not generate merged, parasitic data, then step 304B can continue to receive parasitic data 403 directly from the parallel processes, i.e. parasitic data 403.

Figure 5:
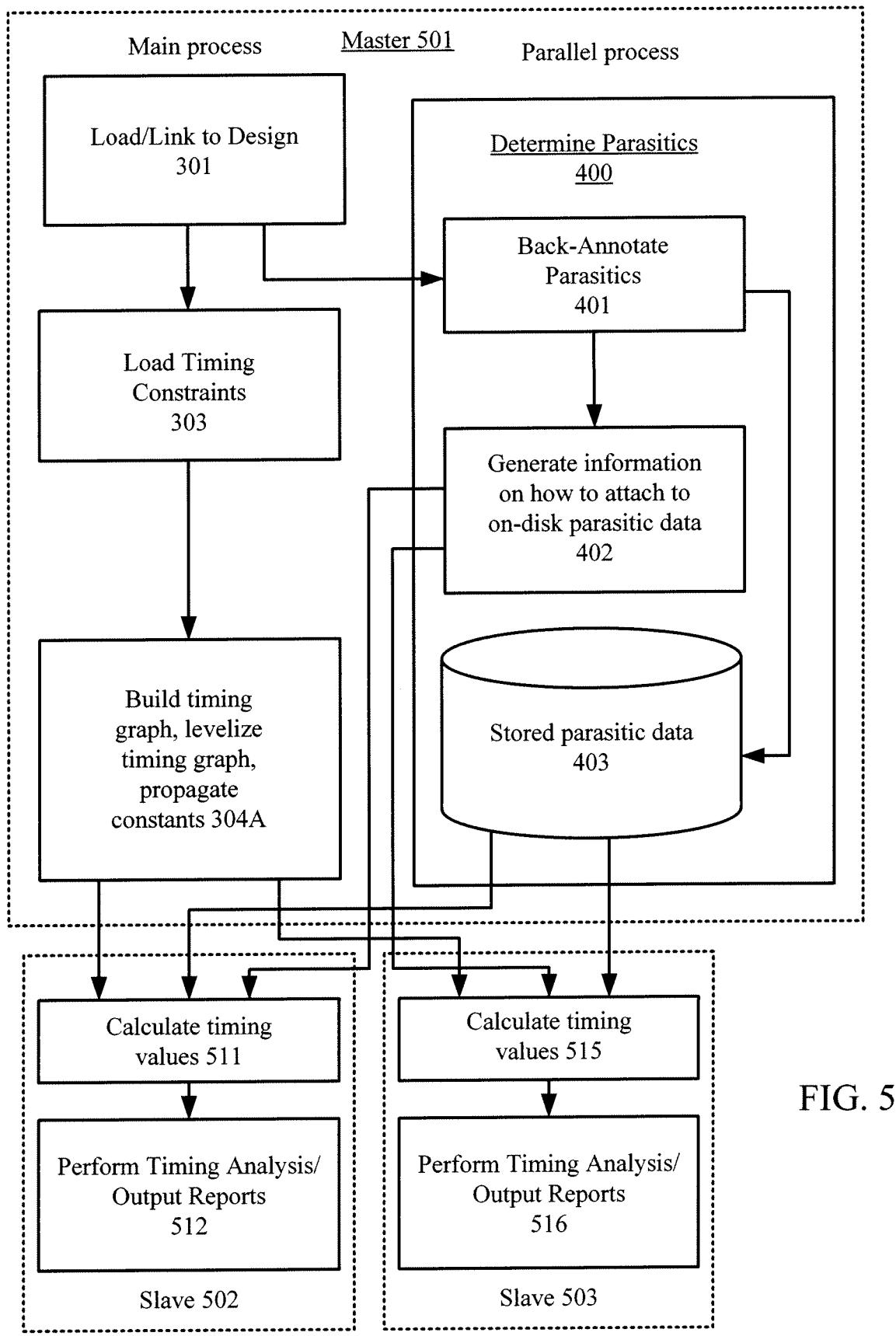
FIG. 5 illustrates an exemplary distributed STA (DSTA) technique that allows slaves to receive the stored parasitic data as well as attachment information from the parallel process. Using this data/information, the slaves can calculate timing values and generate output reports and analysis.

FIG. 5 illustrates an exemplary distributed STA (DSTA) technique that can use stored parasitic data. In this embodiment, a master 501 controls two slaves 502 and 503. In other embodiments, master 501 may control any number of slaves. In one embodiment, master 501 can perform steps 301, 303, 304A, and 400, whereas slaves 502 and 503 can perform timing updates and generate report output.

Specifically, master 501 can partition a netlist and determine which section of the netlist should be processed by each slave. Thus, step 304A (building the timing graph, levelizing the timing graph, and propagating constants in the timing graph to generate a finalized timing graph (as well as other known functions, such as sourcing script, breaking loops, propagating logical clocks, etc.) can be performed for the total IC design, but only a subset of the finalized timing graph relevant to a particular section of the netlist may be provided to each of slaves 502 and 503. In one embodiment, master 501 can also provide specific stored parasitic data 403 and parasitic data attachment information (generated in step 402) to each of slaves 502 and 503 based on their respective netlist sections. Advantageously, in this "push" configuration, slaves 502 and 503 can receive partitioned parasitic data from the parallel process, i.e. step 400.

Figure 6:
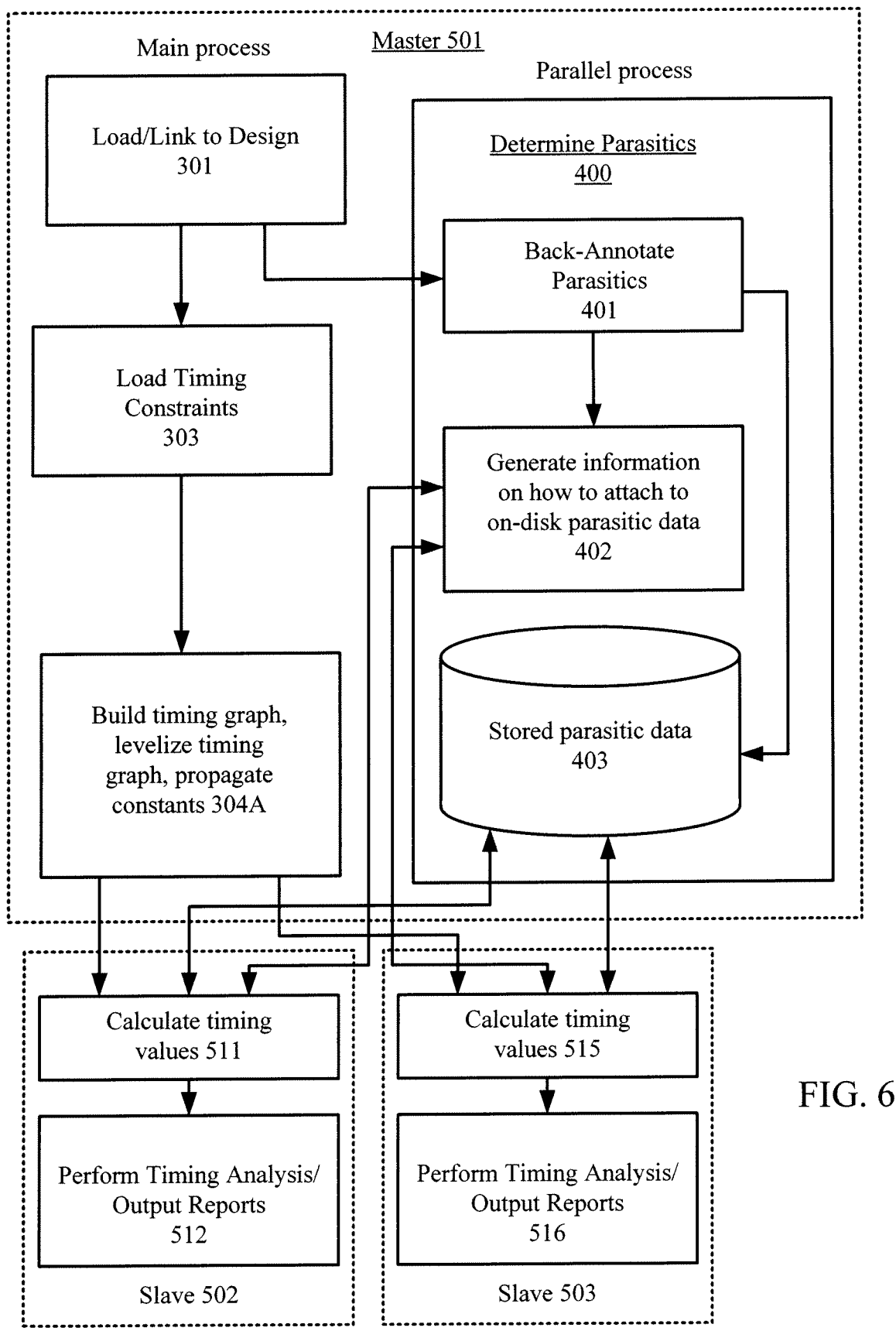
FIG. 6 illustrates an exemplary distributed STA (DSTA) technique that allows slaves to request and receive the stored parasitic data as well as attachment information from the parallel process. Using this data/information, the slaves can calculate timing values and generate output reports and analysis.

In another embodiment shown in FIG. 6, slaves 502 and 503 can directly acquire parasitic data from the parallel process in a "pull" configuration, i.e. slaves 502 and 503 request and then receive (when available) parasitic data and attachment information from master 501. Notably, in either embodiment, the main process in master 501 is freed to perform steps 301, 303, and 304A concurrently and asynchronously with step 400. Thus, by performing step 400 as a parallel process in the master which ends after the generation of stored data is complete, the configurations of FIGS. 5 and 6 can relieve capacity requirements of the master while still providing performance gains because of parallel processing.

After receiving its section-specific graphs, stored parasitic data, and attachment information, slave 502 can calculate timing values in step 511 and use these calculated timing values in step 512 to perform timing analysis and output one or more reports with timing analysis results. Similarly, after receiving its section-specific graphs, stored parasitic data, and attachment information, slave 503 can calculate timing values in step 515 and then use these calculated timing values in step 516 to perform timing analysis and output one or more reports with timing analysis results. In one embodiment (not shown), master 501 can merge the outputs of slaves 502 and 503.

As described above, the parasitic data can be stored on a disk, separate from a master machine. In one embodiment, processing of the parasitics and generating the attachment information can be done using random access memory (RAM). Notably, after the parasitic data and the attachment information are provided to the main process, then the memory associated with the parallel process is no longer needed and can be redeployed for other functions of STA/DSTA or for functions other than STA/DSTA. Thus, using parallel parasitic processing can advantageously decrease the memory footprint needed for STA/DSTA in a master machine.

Figure 7A:
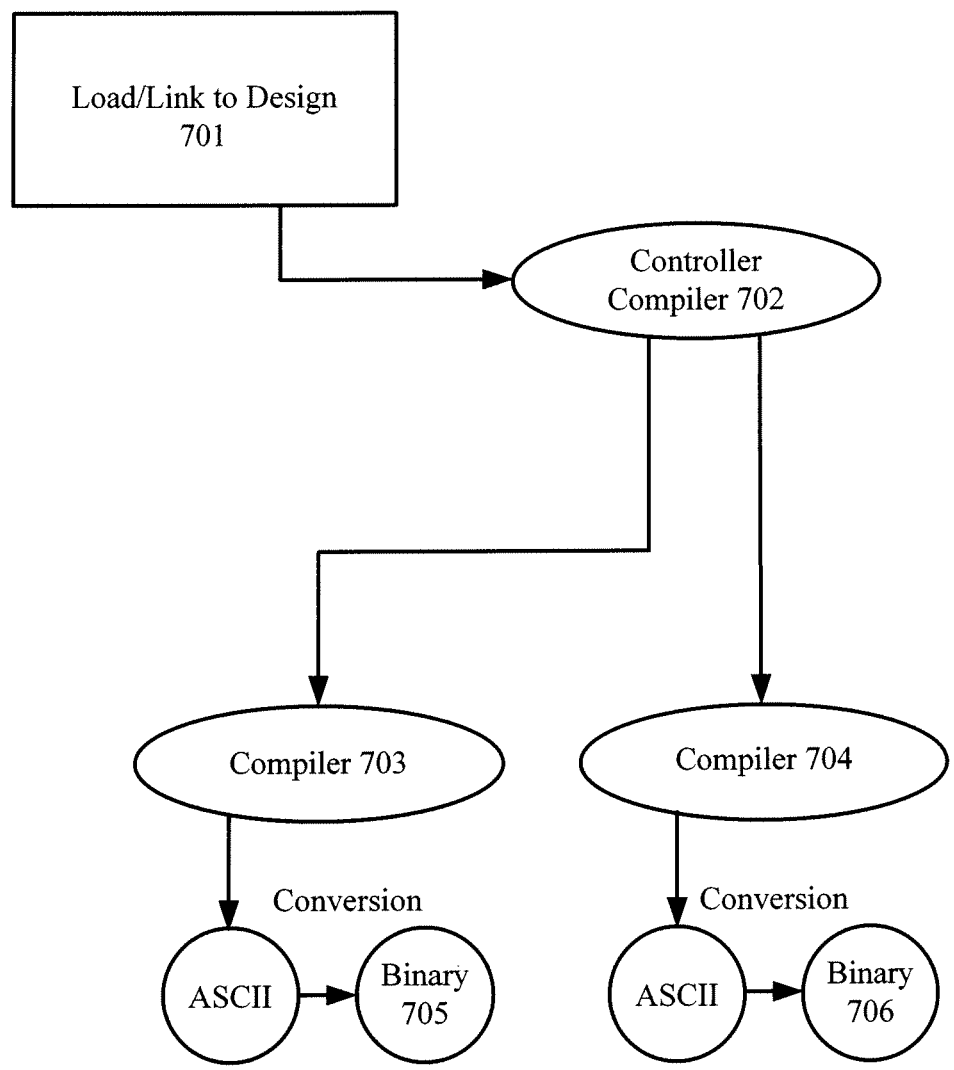
FIG. 7A illustrates an exemplary compilation technique that can improve the runtime of the parallel process and reduce memory requirements.

As discussed above, the parallel process may start before the gate-level netlist is fully loaded for use by the main process. For example, FIG. 7A illustrates an exemplary compilation technique that can improve the runtime of the parallel process. Step 701 can load the design and link to one or more cell libraries at the desired technology node. In one embodiment, step 701 may precede step 301. In another embodiment, step 701 may be step 301, wherein compilation can begin after receiving the first parasitic command.

A compiler controller 702 can launch a plurality of compilers, e.g. compilers 703 and 704, to read one or more sections of the netlist provided by step 701. Compilers 703 and 704 can then compile the interconnect parasitics and generate parasitic files associated with those sections of the netlist. These parasitic files are typically ASCII files in a standard parasitic exchange format (SPEF, an IEEE standard for representing parasitic data of interconnect in ASCII format). Because these ASCII files verbally describe the interconnect parasitics in detail, such description can be very fine grained to the point of being verbose.

Therefore, in one embodiment, compilers 703 and 704 can convert their ASCII files to binary files 705 and 706, respectively. These binary files are effectively compressed, design-independent representations of the parasitic descriptions. Therefore, storing the interconnect parasitic information in a binary format can advantageously reduce memory requirements on the storage device. In addition, these binary files are highly efficient for back-annotation later onto the IC design.

Figure 7B:
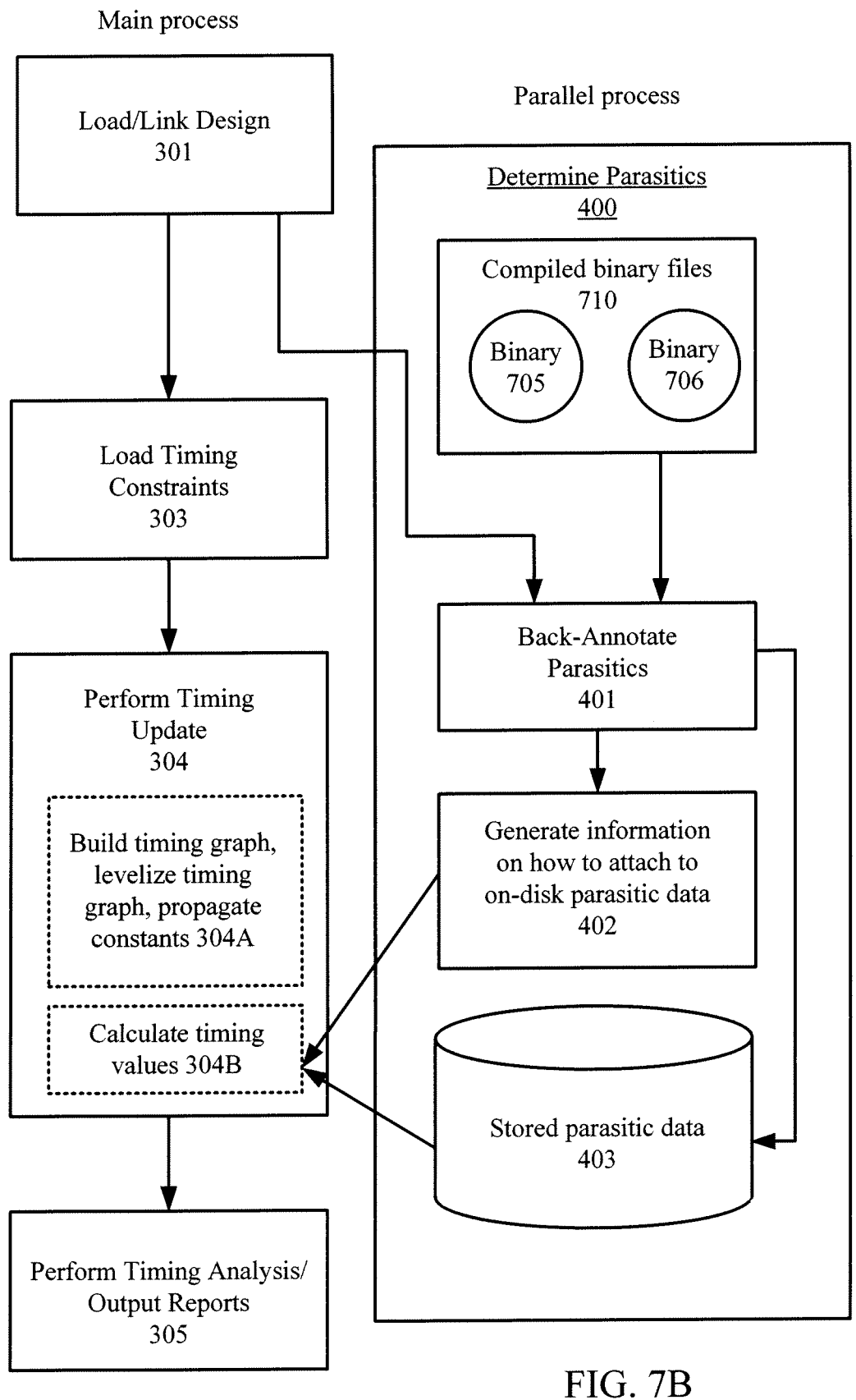
FIG. 7B illustrates an exemplary STA operation using compiled binary files for parallel parasitic processing.

FIG. 7B illustrates an exemplary STA operation using these binary files during parallel parasitic processing. Specifically, step 400 can use compiled binary files 710 (e.g. binary files 705 and 706 (FIG. 7A)) for use in step 401. In one embodiment, step 401 can directly use compiled binary files 710 without conversion back to ASCII format. Note that step 301 can still provide step 401 with the design netlist so that the step 401 can back-annotate the interconnect parasitics onto the IC design and generate stored parasitic data 403. In one embodiment, compiled binary files 710 can be stored in a randomly-addressable database until used by step 401. Note that compiled binary files 710 can be used in DSTA (e.g. in the embodiment shown in FIG. 6) as well as STA.

Figure 1:
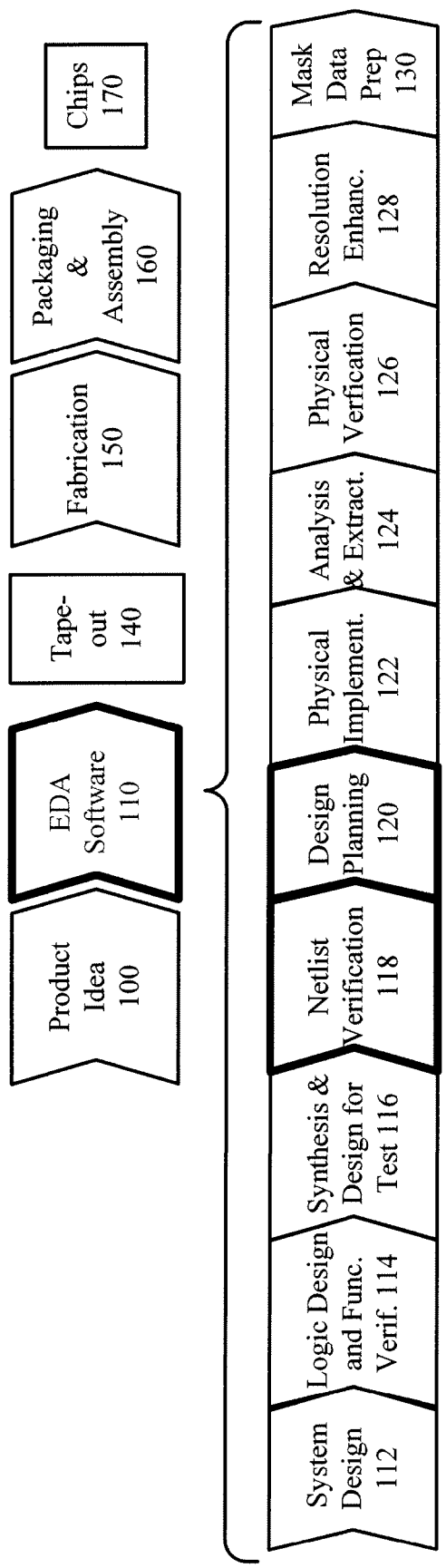
FIG. 1 illustrates a simplified representation of an exemplary digital ASIC design flow.
Figure 2:
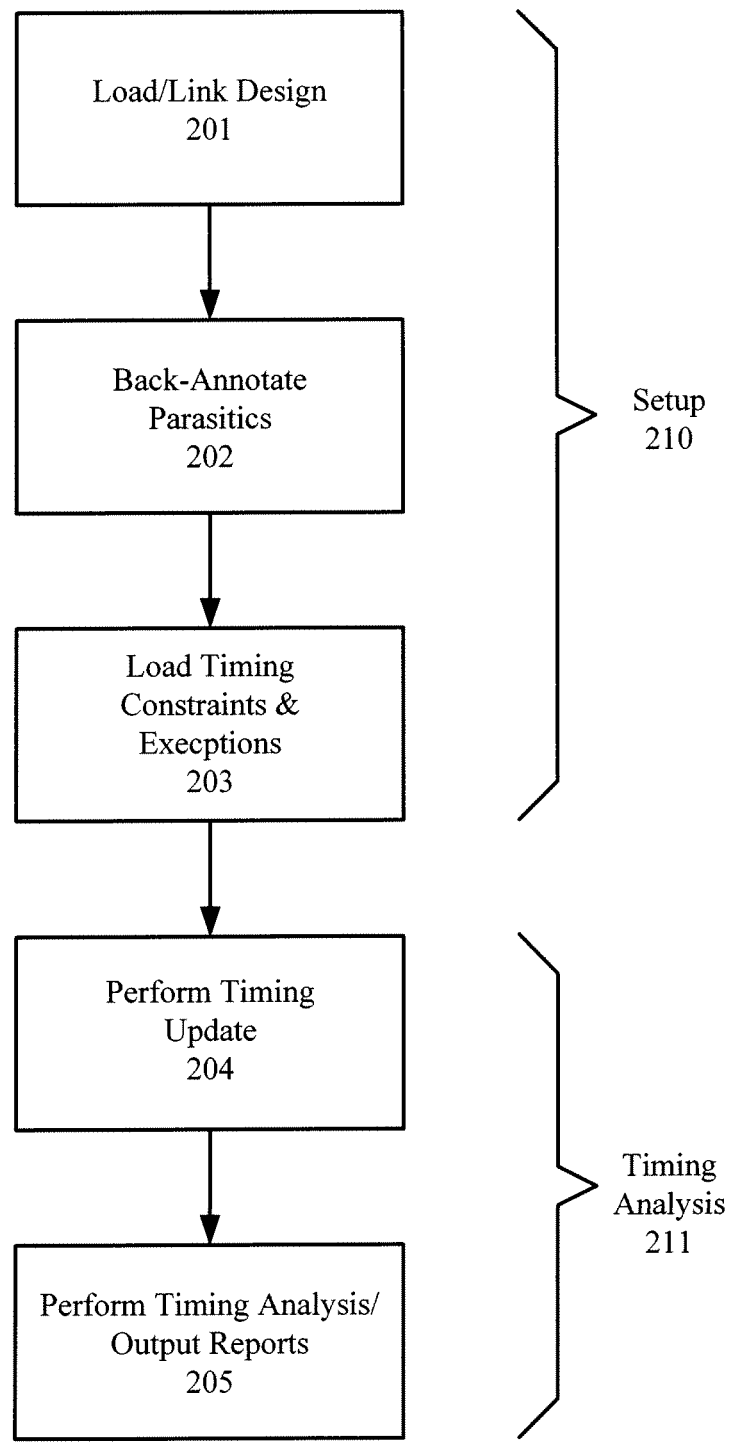
FIG. 2 illustrates a conventional static timing analysis (STA) technique including setup and timing analysis.

Note that the use of one or more parallel processes can be advantageously used in various EDA tools. For example, in one embodiment directed to STA/DSTA, the parallel parasitic processing can be implemented in PrimeTime, which is an EDA tool from Synopsys, Inc. (referring to netlist verification tools in step 118, FIG. 1). In another embodiment directed to STA steps performed in other analysis tools, the parallel parasitic processing can be implemented in Nanotime and/or IC Compiler, which are other EDA tools from Synopsys, Inc. (referring to design planning tools in step 120, FIG. 1).

The STA/DSTA techniques can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all foams of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Note that the above-described multi-process STA/DSTA techniques can also be implemented using multi-threading. Specifically, processes are independent and have separate address spaces, whereas threads are subsets of a process and share address space. Additionally, threads share memory and other resources, whereas processes do not. Thus, for example, the threads of a process share its instructions (i.e. code) and context (i.e. the values that various variables have at any time), whereas processes do not share instructions or context.

Note further that the term "disk" can be defined as any type of non-volatile secondary storage or external memory that is different from the primary storage (i.e. main memory). As a secondary storage, a disk is not directly accessible by the computer. Instead, a computer typically uses its input/output channels to access secondary storage and transfers selected data into buffers of the primary storage.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. For example, note that parallel parasitic processing can also facilitate incremental engineering change order (ECO) flow. Specifically, for STA, the parallel process(es) can update the stored parasitic data or the main process can attach to the parasitic data before proceeding with the ECO. Specifically, if the ECO commands are encountered before Step 304B, they can be handled directly by the parallel process. If the ECO commands are encountered after step 304B, then the ECO commands can be handled natively by the main process.

For DSTA, either the main or parallel process(es) performs the ECO change on disk and simply communicates the effect of ECO to slaves so that the slaves can refresh necessary changes from disk. In one embodiment, the master process queries the location of the nets being changed from slave(s) and updates them directly on disk and communicates the change to all slaves. If the slaves have the interconnect parasitics of changed nets in their memory, they can discard them, and reload from the disk. In another embodiment, the master can designate a set of slave(s) to update the stored parasitics for various nets. Specifically, a net might be present in only one slave, and therefore that slave is designated to update the parasitics of that net. If the net is present in more than one slave, then any one slave can be designated to update the parasitics. Accordingly, it is intended that the scope of the invention be defined by the following Claims and their equivalents.

The invention claimed is:

1. A static timing analysis (STA) technique comprising:
using a computer:
loading an integrated circuit (IC) design and linking the IC design to a cell library;
back-annotating interconnect parasitics onto the IC design;
storing the interconnect parasitics on a storage device;
loading timing constraints to be applied to the IC design;
performing a timing update for the IC design using the timing constraints and stored interconnect parasitics;
generating a report based on the timing update,
wherein performing the timing update includes building a timing graph and levelizing the timing graph.

2. A static timing analysis (STA) technique comprising:
using a computer:
loading an integrated circuit (IC) design and linking the IC design to a cell library;
back-annotating interconnect parasitics onto the IC design;
storing the interconnect parasitics on a storage device;
loading timing constraints to be applied to the IC design;
performing a timing update for the IC design using the timing constraints and stored interconnect parasitics;
generating a report based on the timing update,
wherein performing the timing update includes building a timing graph based on the timing constraints and calculating timing values for the IC design using the timing graph, wherein the timing values include at least one of timing delays, slews, and slacks.

3. A static timing analysis (STA) technique comprising:
using a computer:
in a main process during netlist verification,
loading an integrated circuit (IC) design and linking the IC design to a cell library;
loading timing constraints to be applied to the IC design;
performing a timing update for the IC design;
generating a report based on the timing update;
in a parallel process,
back-annotating interconnect parasitics onto the IC design;
storing the interconnect parasitics on a storage device; and
providing stored interconnect parasitics to the main process during performing the timing update,
wherein the parallel process runs concurrently and asynchronously with the main process, and wherein performing the timing update includes building a timing graph and levelizing the timing graph.

4. A static timing analysis (STA) technique comprising:
using a computer:
in a main process during netlist verification,
loading an integrated circuit (IC) design and linking the IC design to a cell library;
loading timing constraints to be applied to the IC design;
performing a timing update for the IC design;
generating a report based on the timing update;
in a parallel process,
back-annotating interconnect parasitics onto the IC design;
storing the interconnect parasitics on a storage device; and
providing stored interconnect parasitics to the main process during performing the timing update,
wherein the parallel process runs concurrently and asynchronously with the main process, and, wherein performing the timing update includes building a timing graph based on the timing constraints and calculating timing values for the IC design using the timing graph, and wherein the timing values include at least one of timing delays, slews, and slacks.

5. A static timing analysis (STA) technique comprising:
using a computer:
in a main process during netlist verification,
loading an integrated circuit (IC) design and linking the IC design to a cell library;
loading timing constraints to be applied to the IC design;
performing a timing update for the IC design;
generating a report based on the timing update;
in a parallel process,
back-annotating interconnect parasitics onto the IC design;
storing the interconnect parasitics on a storage device; and
providing stored interconnect parasitics to the main process during performing the timing update,
wherein the parallel process runs concurrently and asynchronously with the main process, and wherein the interconnect parasitics are compiled before loading the IC design.

6. The STA technique of claim 5, wherein the compiled interconnect parasitics are compressed in a binary format.

7. The STA technique of claim 6, wherein the parallel process back-annotates the compiled interconnect parasitics onto the IC design.

8. A distributed static timing analysis (DSTA) technique comprising:
using a computer:
in a main process of a master,
loading an integrated circuit (IC) design and linking the IC design to a cell library;
loading timing constraints to be applied to the IC design;
generating graphs associated with the IC design;
in a parallel process of the master,
back-annotating interconnect parasitics onto the IC design;
storing the interconnect parasitics on a disk, thereby creating stored parasitic data;
generating information on attaching to the stored parasitic data;
in each slave,
calculating timing values for a section of the IC design using the timing constraints, the graphs, the stored parasitic data, and the information on attaching, the section being determined by the master;
generating a report based on a timing update,
wherein the parallel process runs concurrently and asynchronously with the main process.

9. The DSTA technique of claim 8, wherein calculating timing values for each section of the IC design includes calculating at least one of timing delays, slews, and slacks.

10. The DSTA technique of claim 8, wherein the calculating timing values includes requesting the stored parasitic data and information on attaching.

11. The DSTA technique of claim 8, wherein the interconnect parasitics are compiled before loading the IC design.

12. The DSTA technique of claim 11, wherein the compiled interconnect parasitics are compressed in a binary format.

13. The DSTA technique of claim 8, wherein the parallel process back-annotates compiled interconnect parasitics onto the IC design.

14. A static timing analysis (STA) technique comprising:
using a computer:
in a main process,
loading an integrated circuit (IC) design and linking the IC design to a cell library;
loading timing constraints to be applied to the IC design;
performing a timing update for the IC design, the performing including building a timing graph;
generating a report based on the timing update;
in a parallel process,
concurrently and asynchronously running one or more parallel processes for processing and storing interconnect parasitics; and
communicating, transferring, or providing stored interconnect parasitics or results to the main process during performing the timing update,
wherein the one or more parallel processes include:
back-annotating interconnect parasitics onto the IC design; and
storing the interconnect parasitics on a storage device.

15. A static timing analysis (STA) technique comprising:
using a computer:
in a main process,
loading an integrated circuit (IC) design and linking the IC design to a cell library;
loading timing constraints to be applied to the IC design;
performing a timing update for the IC design;
generating a report based on the timing update;
in a parallel process,
concurrently and asynchronously running one or more parallel processes for processing and storing interconnect parasitics; and
communicating, transferring, or providing stored interconnect parasitics or results to the main process during performing the timing update,
wherein performing the timing update includes building a timing graph and levelizing the timing graph.

16. A static timing analysis (STA) technique comprising:
using a computer:
in a main process,
loading an integrated circuit (IC) design and linking the IC design to a cell library;
loading timing constraints to be applied to the IC design;
performing a timing update for the IC design;
generating a report based on the timing update;
in a parallel process,
concurrently and asynchronously running one or more parallel processes for processing and storing interconnect parasitics; and
communicating, transferring, or providing stored interconnect parasitics or results to the main process during performing the timing update,
wherein performing the timing update includes building a timing graph and calculating timing values for the IC design based on the timing graph, wherein the timing values include at least one of timing delays, slews, and slacks.

17. A static timing analysis (STA) technique comprising:
using a computer:
in a main process,
loading an integrated circuit (IC) design and linking the IC design to a cell library;
loading timing constraints to be applied to the IC design;
performing a timing update for the IC design;
generating a report based on the timing update;
in a parallel process,
concurrently and asynchronously running one or more parallel processes for processing and storing interconnect parasitics; and
communicating, transferring, or providing stored interconnect parasitics or results to the main process during performing the timing update, wherein the interconnect parasitics are compiled before loading the IC design.

18. The STA technique of claim 17, wherein the compiled interconnect parasitics are compressed in a binary format.

19. The STA technique of claim 18, wherein the parallel process back-annotates the compiled interconnect parasitics onto the IC design.

20. A static timing analysis (STA) technique comprising:
using a computer:
during running of a main process, which performs a timing update for an integrated circuit (IC) design,
automatically identifying, scheduling, and routing interconnect parasitic data of the IC design to one or more different processes to provide temporally overlapping data processing and consumption; and
using results of the one or more different processes in the main process to perform the timing update for the IC design, wherein performing the timing update includes building a timing graph.

* * * * *